Figure 1:
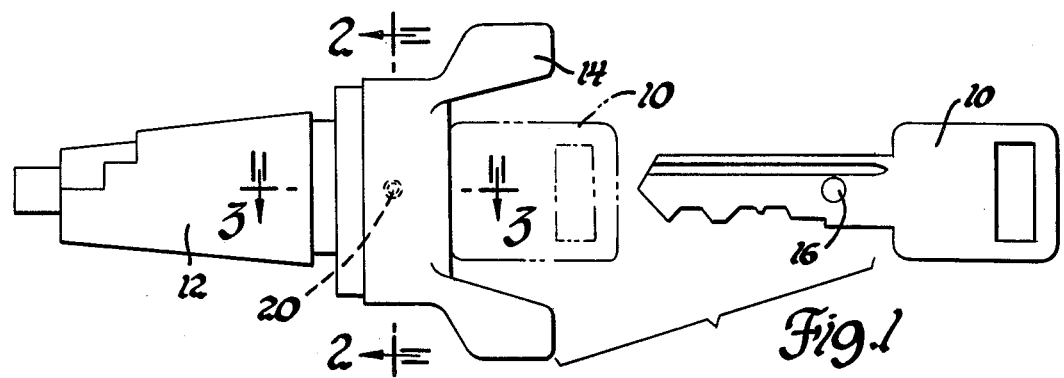

United States Patent [19]

Schroeder

[11] 4,148,372
[45] Apr. 10, 1979

[54] RESISTOR CODED THEFT DETERRENT SYSTEM

[75] Inventor: Thaddeus Schroeder, Sterling Heights, Mich.

[73] Assignee: General Motors Corporation, Detroit, Mich.

[21] Appl. No.: 835,220

[22] Filed: Sep. 21, 1977

[51] Int. Cl.² ............................................. B60R 25/04
[52] U.S. Cl. .............................. 180/114; 123/146.5 B; 307/10 AT; 340/64; 70/DIG. 46
[58] Field of Search .................... 123/198 B, 146.5 B, 123/179 BG; 70/DIG. 46; 180/114; 307/10 AT; 340/285, 63, 64

[56] References Cited

U.S. PATENT DOCUMENTS

| | | | |
|---|---|---|---|
| 3,136,307 | 6/1964 | Richard | 123/179 BG |
| 3,515,891 | 6/1970 | Margeson et al. | 307/10 AT |
| 3,628,099 | 12/1971 | Atkins | 70/DIG. 46 |
| 3,634,724 | 1/1972 | Vest | 123/146.5 B |
| 3,660,624 | 5/1972 | Bell | 70/DIG. 46 |
| 3,870,895 | 3/1975 | Lax et al. | 307/10 AT |
| 4,065,762 | 12/1977 | Walter | 340/285 |
| 4,071,007 | 1/1978 | Arix | 123/146.5 B |

FOREIGN PATENT DOCUMENTS 2436835  2/1976  Fed. Rep. of Germany ....... 123/198 B Primary Examiner—Ira S. Lazarus
Attorney, Agent, or Firm—Albert F. Duke

[57] ABSTRACT

A resistor coded anti-theft system particularly adapted for incorporation as original equipment on a motor vehicle is disclosed. The ignition system is defeated unless an ignition key having both the proper mechanical code and proper code resistor is used to start the vehicle. A selectively destructible fuse device is incorporated in the circuitry to permit determination of the value of the proper code resistor during a final stage of vehicle assembly.

4 Claims, 4 Drawing Figures

U.S. Patent

Apr. 10, 1979

4,148,372

RESISTOR CODED THEFT DETERRENT SYSTEM

This invention relates generally to resistor coded anti-theft systems for motor vehicles and more particularly to such a system which may be activated during the final stages of vehicle assembly so as to not unduly interfere with the normal and speedy assembly of the motor vehicle.

Resistor coded ignition systems have been proposed as a deterrent to forceful removing or bypassing of the standard vehicle ignition lock. Such systems in general respond to a key resistor instead of, or in addition to, the usual ignition key. Typical prior art systems are shown in the patents to Clark et al U.S. Pat. Nos. 3,492,494; Atkins 3,628,099; Richards 3,136,307 and Hansen 3,588,865. In order to discourage tampering it is desirable that the circuitry responding to the key resistor be incorporated in an inaccessible location such as for example the distributor of the vehicle. Since the distributor of the vehicle and the ignition lock and key assembly may be manufactured at different locations, a problem is presented during assembly of the vehicle of ensuring that the proper key is matched with the corresponding distributor. It is also desirable during vehicle assembly operations to periodically start the vehicle which presents a further problem where resistor coded theft deterrent systems are concerned.

In accordance with the present invention the aforementioned assembly problems are solved by a system which is normally disabled during assembly of the vehicle but may be selectively activated during the final stages of vehicle assembly. More particularly, in the present invention the conventionally mechanically coded ignition key is provided with an integral resistor which is connected into one leg of a bridge circuit upon insertion of the key in the ignition lock. If the resistance of the key substantially matches a second resistor in another leg of the bridge circuit the vehicle may be started. If a mismatch occurs, an output signal disables the ignition system. The bridge circuit is preferably located in the distributor of the vehicle. The bridge circuit includes a fusible link which permits the bridge to be nulled as that as long as the fuse is intact any key which operates the mechanical lock can start the vehicle. The fuse also provides current path which permits the value of the decode resistor in the bridge circuit to be remotely measured so that an appropriate code resistor may be incorporated in the ignition key as one of the final vehicle assembly operations. After measurement of the decode resistor value the fuse may be "blown" by passing a sufficient current therethrough and thereafter only the proper key will produce a bridge null and permit starting of the vehicle.

Figure 2:
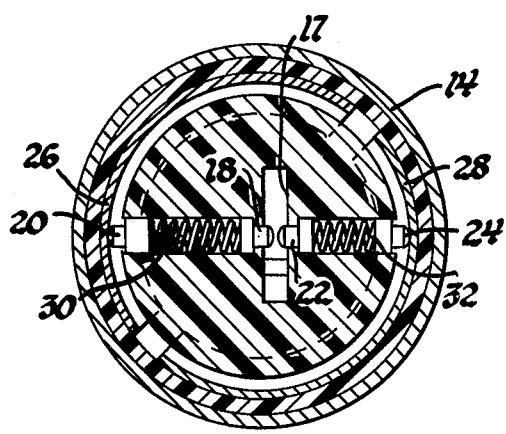
Figure 3:
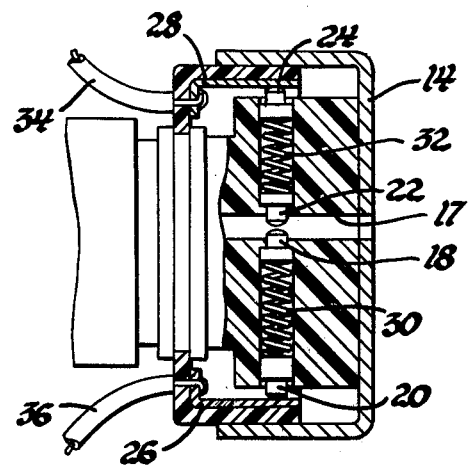
Figure 4:
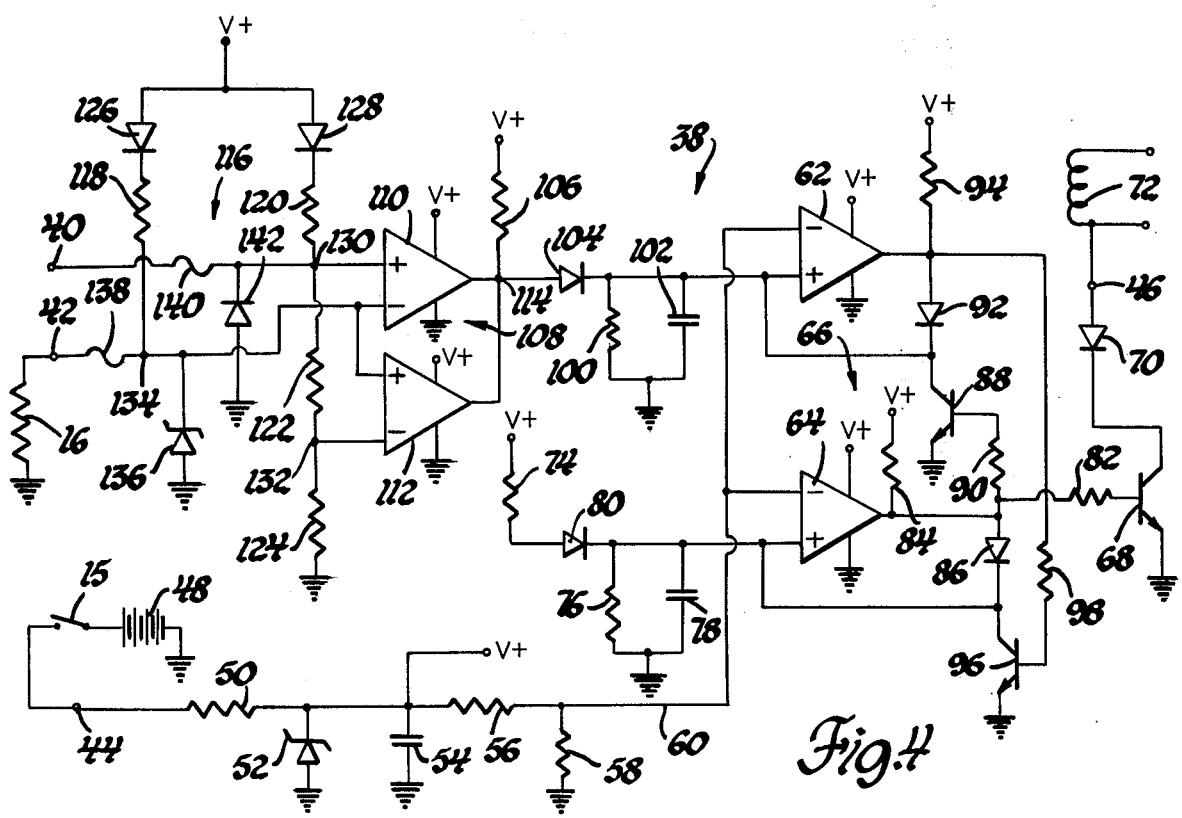

A more complete understanding of the present invention may be had from the following detailed description which should be read in conjunction with the drawings in which:

FIG. 1 is a side elevation view of an ignition key and lock constructed in accordance with the present invention, FIG. 2 is a sectional view along lines 2-2 of FIG. 1, FIG. 3 is a sectional view along lines 3-3 of FIG. 1, and FIG. 4 is a schematic diagram of the circuit of the present invention. Referring now to the drawings and initially to FIGS. 1-3, theconventional mechanically coded ignition key, designated by the numeral 10, is adapted to be inserted in an ignition lock 12 having a rotatably lock knob 14 formed of an insulating material. Insertion of the key 10 in the lock 12 and subsequent rotation of the knob 14 causes an ignition switch 15 (FIG. 4) to be actuated to a closed position to supply power to the various electrical systems on the automobile.

In accordance with the present invention the key 10 is provided with a
pellet 16 and the knob 14 is provided with contacts 18, the conventional and 22, 24 for engaging opposite sides of the resistor pellet 16 when the key 10 is fully inserted into the lock 12 through the opening 17. The contacts 18, 20 and 22, 24 are in electrical contact with suitable slip rings 26 and 28 through bias springs 30 and 32 thereby maintaining electrical continuity during rotation of the knob 14. One of the contact pairs in the knob 14 provides a ground through a conductor 34 for the resistor 16 while the other contact pair is connected with a conductor 36 which in turn is connected with a decoder circuit (FIG. 4) generally located in a compartment other than the passenger compartment. The decoder circuit may if desired to be integrated with the solid state ignition circuit presently in most motor vehicles and located within the distributor.

Referring now to FIG. 4, the decoder circuit is generally designated 38 and has three input terminals 40, 42 and 44 and an output terminal 46. The input terminal 44 is connected to the vehicle battery 48 through the ignition switch 15. The battery 48 is connected through a resistor 50 to a Zener diode 52 and filter capacitor 54 which provides a regulated and filtered supply voltage V+. V+ is applied to voltage divider resistors 56 and 58 to provide a reduced voltage on conductor 60. The conductor 60 is connected with the inverting input of amplifiers 62 and 64 which form a latch circuit generally designated 66 which controls an output transistor 68. The transistor 68 has its emitter collector path connected through a diode 70 to output terminal 46 which in turn is connected to the magnetic pickup coil 72 of the vehicle ignition system. When the transistor 68 is rendered conductive the pickup 72 is grounded through the emitter collector path and the ignition system is rendered inoperative.

When the ignition switch 15 is closed, V+ is also supplied to a timing circuit comprising resistor 74 and 76, capacitor 78 and diode 80. The discharged state of capacitor 78 normally applies ground to the non-inverting input of amplifier 64 so that the output of the amplifier 64 is low when the ignition switch is initially closed. Approximately 15 milliseconds after closure of the ignition switch 15 the capacitor 78 will charge above the threshold of the voltage at the non-inverting input of the amplifier 64 and cause the output of the amplifier 64 to switch to a high state. The base electrode of transistor 68 is connected through resistor 82 to the output of amplifier 64 which is connected through resistor 84 to V+ so that when the output of the amplifier 64 goes high the transistor 68 is turned on. The output of the amplifier 64 is applied to the non-inverting input of amplifier 64 through a diode 86 and also applied to the base of a transistor 88 through a resistor 90. When the output of the amplifier 64 is switched high, the transistor 88, which is connected to V+ through a diode 92 and resistor 94, is turned on and applies ground potential to the non-inverting input of the amplifier 62 to ensure that the output of the amplifier 62 remains in a low state. The output of the amplifier 62 is connected to the base of a transistor 96 through resistor 98. Accordingly, as thus far described the latch 66 will be switched to a state where the output of amplifier 62 is low and the output of amplifier 64 is high to disable the ignition system approximtely 15 milliseconds after the ignition switch 15 is closed. This event may be avoided by applying a threshold voltage to the noninverting input of amplifier 62 within the 15 millisecond period as will be explained hereinafter.

The non-inverting input of the amplifier 62 is connected to V+ through a timing network comprising resistor 100, capacitor 102, diode 104, and resistor 106. A window detector generally designated 108 and comprising amplifiers 110 and 112 has its output connected to the junction 114. A bridge network generally designated 116 is connected with the detector 108 and comprises resistors 118, 120, 122, 124 and diodes 126 and 128. The voltage divider comprising resistors 120, 122 and 124 establishes an upper voltage limit of the window detector 108 at the junction 130 connected with the non-inverting input of the amplifier 110 and a lower voltage limit at the junction 132 connected with the inverting input of the amplifier 112. The code resistor 16 is, upon insertion of the ignition key 10, connected in the bridge 116 at the input terminal 42 and established a voltage at junction 134 connected with the inverting input of the amplifier 110 and the non-inverting input of the amplifier 112. The junction 134 is connected with a Zener diode 136 and to the input terminal 42 through a fuse 138. Input terminal 40 is provided for measuring the value of resistors 122 and 124 and is connected to the junction 130 through a fuse 140 to ground through a diode 142.

If the correct ignition key is inserted into the ignition lock and rotated to the on position, the value of the resistor 16 will be such that the voltage at the junction 134 is within the upper and lower voltage limits established by the window detector 108 and the output of both the amplifiers 110 and 112 will be driven high. If the wrong key is inserted the voltage at the junction 134 will be outside the limits of the detector 108 and one of the outputs of the amplifiers 110 or 112 will be low. If the correct key is inserted the high output of detector 108 causes the capacitor 102 to charge and switch the latch 66 to its enable state where the output of amplifier 62 is high. The output of the amplifier 62 is fed back to the non-inverting input through diode 92 to maintain the high output. The high output of amplifier 62 also turns on transistor 96 which grounds the non-inverting input of amplifier 64 ensuring that the output of amplifier 64 is low so that the transistor 68 is non-conductive and the ignition system is enabled. If the wrong key is inserted the low output of detector 108 prevents charging of the capacitor 102 and the charging of capacitor 78 switches the latch 66 to its disable state where the ignition system is disabled. Consequently, the proper key must be inserted and for the length of time, necessary to charge capacitor 102 to the threshold of amplifier 62 (10 milliseconds for example) and if the wrong value of resistance is inserted a delay interval, corresponding to the discharge of capacitor 78 through resistor 76 (2 minutes for example), is imposed before a second resistance value can be effective. Thus, scanning for the proper resistance value is discouraged.

The fuse 140 permits the sum of the values of resistors 122 and 124 to be determined, during vehicle assembly, to determine what the value of resistor 16 must be in order to establish the proper voltage at the junction 134. Also during assembly the input terminals 40 and 42 may be bridged or shorted to produce a high output from detector 108 thereby permitting an engine to start without a key. The amplifier 110 is preferably constructed with an internal bias to ensure that its output is driven to a high state when the conductors 40 and 42 are bridged. After selection of the proper resistance 16 the fuse 140 is destroyed by applying a negative voltage at terminal 40 and passing a sufficiently high current through diode 142 and fuse 140. The fuse 138 is provided to prevent attempted defeat of the system by applying a high voltage at the input 42. Should this be attempted the Zener diode 136 breaks down and conducts sufficient current to destroy the fuse 138 thereby preventing insertion of the proper resistor 16 and consequently disabling the ignition system. The diodes 126 and 128 effectively prevent attempts to measure the values of resistors 122 and 124 from the terminal 40.

Having thus described my invention what I claim is:

1. A resistor value coded anti-theft system for a motor vehicle comprising in combination,
    a key actuable ignition lock means adapted to receive a key and including contact elements effective to engage and define a circuit path including a resistance integral with said key,
    means defining a circuit responsive to the value of the resistance between said contact elements and effective to enable engine start when such resistance is of a predetermined value in relation to an internal resistance of selectable value in said circuit means,
    said circuit means further initially having a fusible element which enables engine start independent of the value of said resistance so as to permit engine start at will during assembly operations,
    whereby at an appropriate stage of vehicle assembly said fusible element may be destroyed and thereby permit said circuit means to discriminate between different values of said resistance between said contact elements.

2. A motor vehicle theft deterrent system comprising an ignition switch connected with a source of DC potential, ignition lock means for closing said ignition switch in response to insertion and rotation of an ignition key having the proper mechanical code, said ignition key including a key code resistor forming an integral part thereof, said ignition lock means including contact means arranged to be engaged by said key code resistor means upon insertion of said ignition key in said lock means,
    decoder circuitry connected with said ignition switch and said contact means, said decoder circuitry developing a disable signal for inhibiting the operation of said motor vehicle in response to closure of said ignition switch if said key code resistor means is not within predefined limits established by said decoder circuitry, said decoder circuitry further including time delay means for maintaining said disable signal for a predetermined time interval after opening of said ignition switch, fuse means providing a destructible circuit path connected to said decoder circuitry for determining a suitable value for said key code resistor during assembly of said motor vehicle.

3. A motor vehicle theft deterrent system comprising an
    ignition switch connected with a first source of DC potential, ignition lock means for closing said ignition switch in response to insertion and rotation of an ignition key having the proper mechanical code, said ignition lock means including contact means arranged to be engaged by a key code resistor forming an integral part of said ignition key upon insertion of said ignition key in said lock means, said lock means further including means providing an electrical ground path for said key code resistor means, decoder circuitry located in a compartment of said motor vehicle other than the passenger compartment, said decoder circuitry comprising window detector means including resistor means establishing upper and lower voltage limits for said detector means, conductor means extending between said compartments and connecting said contact means with said detector means, fusible link means connected with said detector means providing an interruptable circuit path for measuring the value of said resistor means to thereby permit selection of the proper key code resistor, latch means having an enable state and a disable state first time delay means for driving said latch means to said disable state a predetermined interval after closure of said ignition switch, and for maintaining said latch means in said disable state for a predetermined interval of time after opening of said ignition switch, said latch means preventing the operation of said vehicle when in said disable state, said detector means developing a trigger signal if the resistance of a key code resistor establishes a voltage input to said detector which is within said upper and lower voltage limits, second time delay means having a time constant which is shorter than the time constant of said first time delay means responsive to said trigger pulse for driving said latch means to said enable state and inhibiting said first time delay means, said latch means permitting the operation of said motor vehicle when in said enable state.

4. A motor vehicle theft deterrent system comprising, an ignition switch connected with a first source of DC potential, ignition lock means for closing said ignition switch in response to insertion and rotation of an ignition key having the proper mechanical code, said ignition lock means including contact means arranged to be engaged by a key code resistor forming an integral part of said ignition key upon insertion of said ignition key in said lock means, said lock means further including means providing an electrical ground path for said key code resistor means, decoder circuitry located in a compartment of said motor vehicle other than the passenger compartment, said decoder circuitry comprising window detector means including resistor means establishing upper and lower voltage limits for said detector means, fusible link means connected with said detector means providing an interruptable circuit path for measuring the value of said resistor means to thereby permit selection of the proper key code resistor, conductor means extending between said compartments and connecting said contact means with said detector means, said conductor means including additional fusible link means, voltage breakdown means connected with said detector means and responsive to an input voltage on said conductor means above a predetermined value for causing a current to pass through said additional fusible link means sufficient to interrupt the circuit between said contact means and said detector means, latch means having an enable state and a disable state first time delay means for driving said latch means to said disable state a predetermined interval after closure of said ignition switch, and for maintaining said latch means in said disable state for a predetermined interval of time after opening of said ignition switch, said latch means preventing the operation of said vehicle when in said disable state, said detector means developing a trigger signal if the resistance of a key code resistor establishes a voltage input to said detector which is within said upper and lower voltage limits, second time delay means having a time constant which is shorter than the time constant of said first time delay means responsive to said trigger pulse for driving said latch means to said enable state and inhibiting said first time delay means, said latch means permitting the operation of said motor vehicle when in said enable state.

* * * * *

UNITED STATES PATENT OFFICE
CERTIFICATE OF CORRECTION

Patent No. 4,148,372　　　　　　　　　Dated April 10, 1979

Inventor(s) Thaddeus Schroeder

It is certified that error appears in the above-identified patent and that said Letters Patent are hereby corrected as shown below:

Column 1, line 65, "Referring now to the drawings and..." should begin a new paragraph.

Column 1, line 66, "theconventional" should read -- the conventional --.

Column 2, lines 8-9, before "pellet" insert -- resistor --;

Column 2, line 10, delete "the conventional" and insert -- 20 --.

Column 3, line 24, "established" should read -- establishes --.

Signed and Sealed this

Seventeenth Day of July 1979

[SEAL]

Attest:

Attesting Officer

LUTRELLE F. PARKER
Acting Commissioner of Patents and Trademarks